E. G. KAY.
LIFTING TONGS.
APPLICATION FILED MAY 6, 1920.
1,360,114.
Patented Nov. 23, 1920.
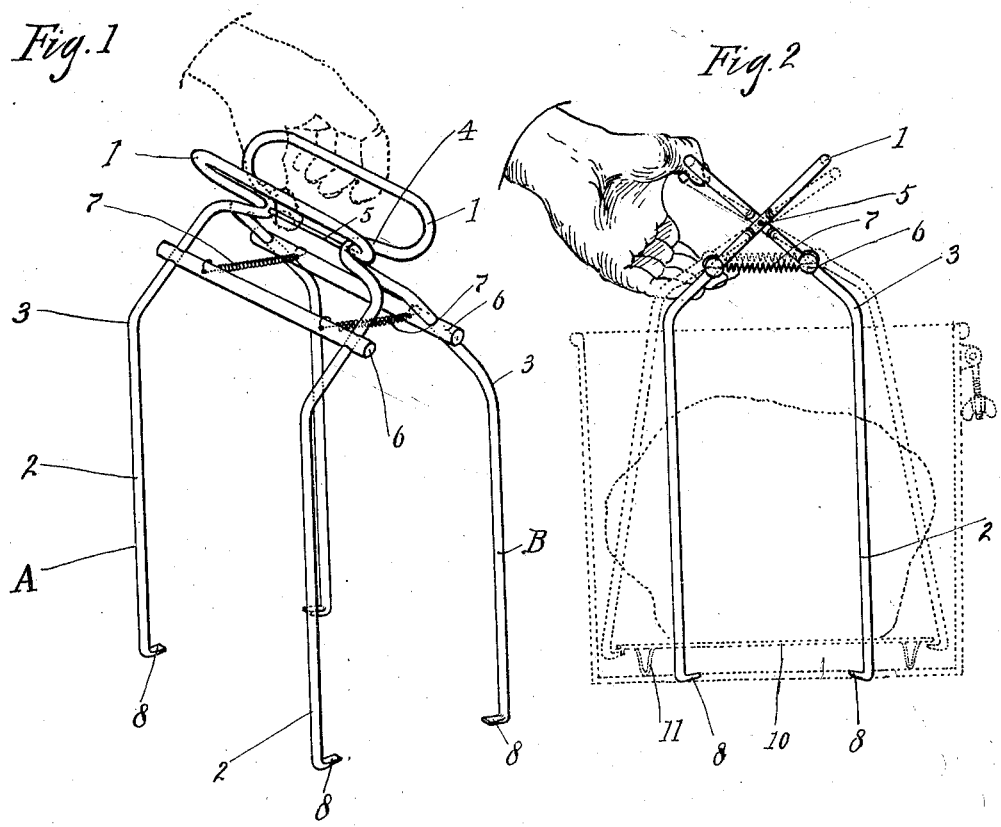
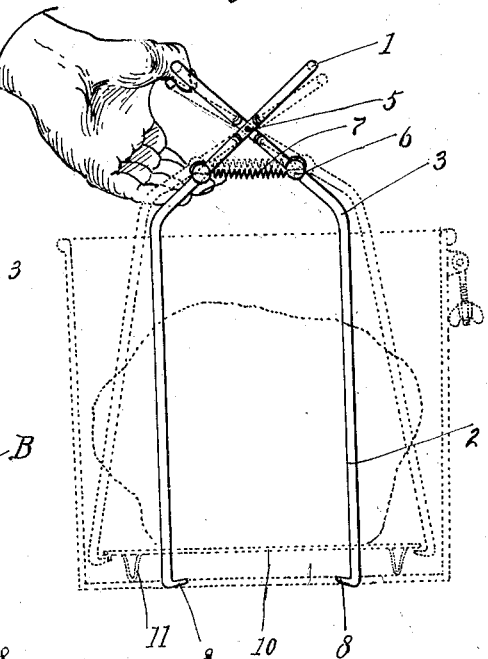
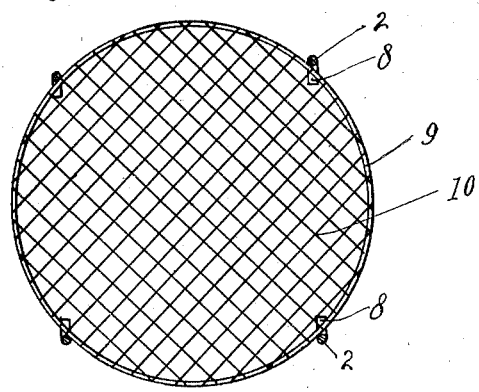
Inventor
Emily G. Kay
by A. C. Johnson
her Attorney.

UNITED STATES PATENT OFFICE.

EMILY GRACE KAY, OF ST. PAUL, MINNESOTA.

LIFTING-TONGS.

1,360,114.  Specification of Letters Patent.  Patented Nov. 23, 1920.

Application filed May 6, 1920. Serial No. 379,198.

*To all whom it may concern:*

Be it known that I, EMILY GRACE KAY, a citizen of the United States, residing at St. Paul, in the county of Ramsey and State of Minnesota, have invented certain new and useful Improvements in Lifting-Tongs, of which the following is a specification.

This invention relates to lifting tongs and more particularly to a type designed for use in connection with cooking utensils such a kettles at the bottom of which plates or screens may be placed to support in elevated position the contained food stuff. When such utensils are comparatively deep and have very steep side walls as is the case in round kettles of almost uniform diameter, removal of the heated food becomes very difficult, it being necessary at times, to either remove the food in parts or allow the kettle to cool. It is very unsatisfactory to reduce the food to fragments in the process of removal, as is also the cooling of the kettle when a continuous use thereof is desired.

An object of the invention is to provide lifting tongs neat in appearance and simple of manufacture that may be operated from a position outside the kettle to avoid the intense heat in the interior thereof, and that may be manipulated with one or both hands to open and close the jaws thereof to lift the food bodily.

Another object of the invention is to provide in a device of the class described, pairs of long straight rod-like jaw members formed so as to be capable of being pushed from above downwardly into the space surrounding the food immediately adjacent the wall of the kettle, so as to contact with the latter to be guided thereby, the members being of comparatively small diameter so as to be easily plunged through any softened food body projecting into the path thereof.

To this end the invention consists in the features of construction, combination and arrangement of parts hereinafter described and claimed. In the drawings:

Figure 1 is a perspective view of the invention showing it in its normal out-of-use position.

Fig. 2 is an end elevation of the invention, the dotted lines showing the device in operative position in a deep kettle, and Fig. 3 is a top view of a wire mesh food support showing the relative position of the hook ends of the jaws preparatory to lifting the support.

Referring to Fig. 1, A and B designate oppositely disposed alined jaw members identical in shape, each being formed of a piece of straight wire bent midway between its ends to form an inverted U disposed in a vertical plane and having an elongated loop or handle portion 1 joining together the top of two parallel legs 2, the handle end or arched portion of the U being bent out of its plane at 3 so as to form an obtuse angle therewith. The legs 2 have oppositely disposed indents 4, coöperating to receive the horizontally disposed pintle 5 rotatably journaled in the indents 4 of the jaw members, the pintle being suitably upset at its ends to hold it positioned. The jaw members are thus, symmetrically pivoted together to operate like a pair of scissors. Between the pintle and the bend 3, and serving as an auxiliary handle, is the bar 6 parallel with the handle 1, through which the legs 2 are projected and in which they are firmly secured, said bars serving also as a brace to keep the vertical portion of the legs in fixed spaced relation. Connecting the bars 6 are the coil springs 7 which latter tend to draw the bars toward each other. At its lower extremity each of the legs is formed with an inwardly and upwardly directed flattened lifting toe or hook 8, the slight upward inclination thereof tending to more firmly hold the border wire 9 of the supporting screen 10 against slipping off, the latter having suitable legs 11 to hold the food out of direct contact with the bottom of the kettle. The four legs 2 together with their respective hooks form what may be termed two pairs of jaws. In use, the tongs are projected into the top of the kettle, adjacent handles 6 and 1 being then pressed toward each other by the hand of the operator as shown in Fig. 2, until the jaws abut against the wall of the kettle; the device is then pushed downward and brought into engagement with the screen so as to bring hooks 8 thereof into the position shown in Fig. 3. The handles 1—1 are then gripped as shown in Fig. 1 whereby the jaw members A and B fulcrumed on the pintle 5 clampingly engage the screen. By making the jaw members of comparatively small wire they easily cut into the cooked food such as meat and the like so that food extending into the path of the jaws does not render the device inoperative. By constructing the device in the manner described large bulks of food may be straddled.

By providing the auxiliary handles the jaws may be spread by a closing action of the hand, it being unhandy and requiring considerable force and both hands to separate the jaws by the main handles. Fig. 1 shows the device in its normal state, the coil springs, being normally non-compressible or, in other words, the coils thereof being contactingly adjacent one another.

It is to be understood that ordinary dishes may be used as substitutes for the screen 10, the rim of the dish being gripped in the same manner as the wire 9 of the screen.

I claim:

1. Lifting tongs, comprising pairs of oppositely disposed jaws, a fulcrum for said jaws, main handles above said fulcrum for transmitting a closing action to said jaws, and auxiliary handles to be operated in conjunction with said main handles to spread said jaws as and for the purpose set forth.

2. Tongs of the class described, comprising pairs of oppositely disposed alined jaws pivotally connected so as to swing toward each other, a main handle for each jaw adjacently alined one with the other above said pivotal connection for concurrently operating both jaws to move them toward each other by a closing movement of the hand, and an auxiliary handle for each jaw adjacently alined with the main handle of the other jaw to be operated in conjunction therewith to concurrently operate both jaws to move them away from each other by a closing movement of the hand.

3. Lifting tongs, comprising two jaw members symmetrically pivoted together to form closable jaws adapted to grip a disk between them, each jaw member consisting of a wire bent U shaped, the U being subsequently bent intermediate its height to form an obtuse angle, the free ends of the legs of the U being bent in the same direction of said subsequent bend to form comparatively short hooks, the pivot of the jaw member being located between said subsequent bend and the arch of the U, and a brace member parallel with the arch of the U and located between said pivot and said subsequent bend for the purpose set forth.

4. Lifting tongs adapted for use in removing hot dishes from a comparatively deep round cooking utensil, having a removable auxiliary bottom, comprising pairs of oppositely disposed jaws, a fulcrum for said jaws, main handles above said fulcrum for transmitting the closing action to said jaws, and auxiliary handles to be operated in connection with said main handles to operate said jaws as and for the purpose set forth.

In testimony whereof I affix my signature.

EMILY GRACE KAY.